(12) United States Patent
Kang

(10) Patent No.: US 12,119,643 B2
(45) Date of Patent: Oct. 15, 2024

(54) DATA COLLECTION APPARATUS OF POWER SYSTEM

(71) Applicant: LS ELECTRIC CO., LTD., Anyang-si (KR)

(72) Inventor: Hoyoung Kang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 3 days.

(21) Appl. No.: 17/925,191

(22) PCT Filed: Apr. 28, 2021

(86) PCT No.: PCT/KR2021/005358
§ 371 (c)(1),
(2) Date: Nov. 14, 2022

(87) PCT Pub. No.: WO2021/230540
PCT Pub. Date: Nov. 18, 2021

(65) Prior Publication Data
US 2023/0171316 A1 Jun. 1, 2023

(30) Foreign Application Priority Data
May 11, 2020 (KR) .......................... 10-2020-0056131

(51) Int. Cl.
*H02J 13/00* (2006.01)
*G06Q 50/06* (2024.01)
(Continued)

(52) U.S. Cl.
CPC ........ *H02J 13/00001* (2020.01); *G06Q 50/06* (2013.01); *H04L 69/18* (2013.01); *H04L 69/26* (2013.01); *Y04S 40/12* (2013.01)

(58) Field of Classification Search
CPC ........... H04L 69/08; H04L 2012/40228; H04L 69/18; H04L 69/26; H04L 67/01;
(Continued)

(56) References Cited

U.S. PATENT DOCUMENTS

| 6,366,987 B1* | 4/2002 | Tzelnic | G06F 11/2094 |
| | | | 714/E11.122 |
| 2005/0171753 A1* | 8/2005 | Rosing | G06F 30/33 |
| | | | 703/18 |

(Continued)

FOREIGN PATENT DOCUMENTS

| KR | 101125378 B1 | 3/2012 |
| KR | 101423109 B1 | 7/2014 |

(Continued)

OTHER PUBLICATIONS

Notice of Allowance for related Korean Application No. 10-2020-0056131; action dated Mar. 10, 2023; (6 pages).
(Continued)

*Primary Examiner* — Schquita D Goodwin
*Assistant Examiner* — Linh T. Nguyen
(74) *Attorney, Agent, or Firm* — K&L Gates LLP

(57) ABSTRACT

The present specification relates to a data collection apparatus of a power system, the data collection apparatus comprising: a communication unit that communicates with a plurality of sites using different communication protocols to receive, from the plurality of sites, data about energy use information; a storage unit that stores a plurality of data models respectively corresponding to the communication protocols to store the data in each of the plurality of data models; and a processing unit that generates a basic data model by performing data modeling according to any one of the communication protocols, generates one or more extended data models by performing data modeling accord-
(Continued)

ing to the rest of the communication protocols, includes the extended data models in the basic data model, and stores the included extended data models in the storage unit.

9 Claims, 2 Drawing Sheets

(51) Int. Cl.
  *H04L 69/00* (2022.01)
  *H04L 69/18* (2022.01)
(58) Field of Classification Search
  CPC ..... H02J 13/00001; G06N 20/00; G06N 5/04; G06N 20/20; Y04S 40/12
  See application file for complete search history.

(56) References Cited

U.S. PATENT DOCUMENTS

| | | | | |
|---|---|---|---|---|
| 2014/0025321 | A1* | 1/2014 | Spanier | G01R 21/133 702/62 |
| 2015/0097697 | A1* | 4/2015 | Laval | H04L 69/03 340/870.02 |
| 2016/0043549 | A1* | 2/2016 | Beauregard | H02J 3/00 700/286 |
| 2016/0162804 | A1* | 6/2016 | Agarwal | G06Q 30/016 706/12 |
| 2016/0254929 | A1* | 9/2016 | Thiel | H04L 5/14 370/329 |
| 2017/0024824 | A1* | 1/2017 | Elser | G06F 16/24578 |
| 2019/0327346 | A1* | 10/2019 | Zeng | G06F 40/30 |
| 2020/0210869 | A1* | 7/2020 | Anicic | G06N 5/022 |
| 2020/0278646 | A1* | 9/2020 | Sakiyama | G05B 13/0265 |
| 2021/0081181 | A1* | 3/2021 | Schmitt | G06F 8/24 |
| 2021/0182307 | A1* | 6/2021 | Ober | H04L 69/08 |
| 2021/0342122 | A1* | 11/2021 | Lee | G06F 8/10 |
| 2021/0405629 | A1* | 12/2021 | Malakuti | G05B 19/045 |
| 2022/0147031 | A1* | 5/2022 | Feng | G06F 12/0292 |
| 2023/0121673 | A1* | 4/2023 | He | G06F 8/35 717/104 |

FOREIGN PATENT DOCUMENTS

| | | |
|---|---|---|
| KR | 101696500 B1 | 1/2017 |
| KR | 20170122150 A | 11/2017 |
| KR | 101843333 B1 | 3/2018 |
| KR | 20200037816 A | 4/2020 |

OTHER PUBLICATIONS

International Search Report for related International Application No. PCT/KR2021/005358; action dated Jul. 29, 2022; (6 pages).
Written Opinion for related International Application No. PCT/KR2021/005358; action dated Jul. 29, 2022; (8 pages).
Office Action for related Korean Application No. 10-2020-0056131; action dated Nov. 9, 2022; (4 pages).

* cited by examiner

FIG. 1
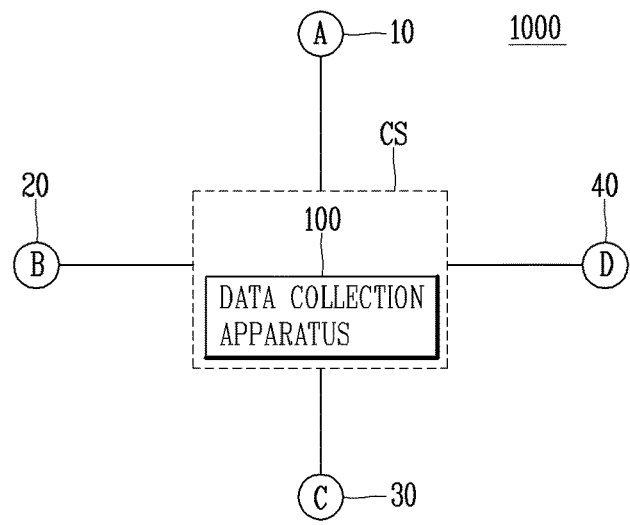
FIG. 2
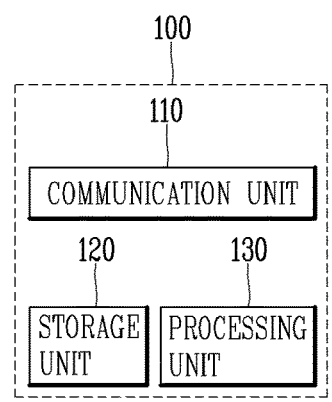
FIG. 3
| FIRST DATA MODEL | |
|---|---|
| (DATA) | SECOND DATA MODEL |
| a | THIRD DATA MODEL |
| b | |
| c | FOURTH DATA MODEL |
| d | |
| ⋮ | ⋮ |

DATA COLLECTION APPARATUS OF POWER SYSTEM

CROSS-REFERENCE TO RELATED APPLICATIONS

This application is the National Stage filing under 35 U.S.C. 371 of International Application No. PCT/KR2021/005358, filed on Apr. 28, 2021, which claims the benefit of earlier filing date and right of priority to Korea utility model Application No. 10-2020-0056131 filed on May 11, 2020, the contents of which are all hereby incorporated by reference herein in their entirety.

FIELD

The present disclosure relates to a data collection apparatus communicating with a plurality of sites to collect data in a power system that monitors a plurality of sites.

BACKGROUND

A power system includes a supervisory control and data acquisition (SCADA) and distribution control system (DCS) that provides a monitor/control function, and an energy management system (EMS) that provides an advanced power application for grid management and analysis, and monitors and controls ESS and PV. In recent years, with the demand for a big data framework, the technology of database is improved and the product lines are also diversified.

Such a power system may be built as a system for centrally monitoring a plurality of sites constituting a small-scale power network (micro grid), in which a central system communicates with a plurality of sites to receive data from each site, and to perform monitoring based on the received data. Here, the plurality of sites may have different communication protocols used by each system, and the central system needs to support all the corresponding communication protocols for communication with the plurality of sites. For example, when each of the four sites A, B, C, and D uses protocols A', B', C', and D', respectively, the central system must be provided with a driver and data storage space for all protocols A', B', C', and D' to communicate with the sites A, B, C, and D.

In this case, since a plurality of communication protocols and data applied to each of the plurality of communication protocols must be stored in a communication element of the central system, an amount of data storage required for the communication element is inevitably increased. Furthermore, since a lot of data is transmitted/received and managed by the communication element, there is a risk of delay in communication and data processing of the communication element.

SUMMARY

An aspect of the present disclosure is to overcome the foregoing limitations.

Specifically, an aspect of the present disclosure is to provide a data collection apparatus of a power system capable of collecting data from a plurality of sites using various communication protocols by supporting the various communication protocols.

In addition, another aspect of the present disclosure is to provide a data collection apparatus of a power system capable of enhancing data compatibility.

In order to solve the foregoing problems, a data collection apparatus of a power system according to the present disclosure may include another data model for any one of data models for supporting a communication protocol as a solution means.

That is, the data collection apparatus has a technical feature of generating a plurality of data models corresponding to a communication protocol according to the present disclosure, and allowing any one data model to include the other data models so as to structuralize the data model.

An embodiment of a data collection apparatus of a power system having the foregoing technical features as a problem solving means, which is a data collection apparatus of a power system that manages a plurality of sites using different communication protocols, the data collection apparatus may include a communication unit that communicates with the plurality of sites to receive data on energy use information from the plurality of sites, a storage unit that stores a plurality of data models corresponding to the communication protocols, respectively, to store the data in the plurality of data models, respectively, and a processing unit that performs data modeling according to any one of the communication protocols to generate a basic data model, and performs data modeling according the other communication protocols to generate one or more extended data models so as to allow the extended data models to be included in the basic data model and stored in the storage unit.

In an embodiment, each of the plurality of sites may use any one of OPC UA (Open Platform Communications Unified Architecture), RESTful API, MODBUS, and DNP protocols.

In an embodiment, at least one of the plurality of sites may use a model according to the OPC UA protocol.

In an embodiment, the others except for at least one of the plurality of sites may use any one of the RESTful API, MODBUS, and DNP protocols.

In an embodiment, the basic data model may be a model according to the OPC UA protocol.

In an embodiment, the extended data model may be a model according to any one of the RESTful API, MODBUS, and DNP protocols.

In an embodiment, the communication unit may perform communication according to the communication protocol based on the plurality of data models.

In an embodiment, the processing unit may process data stored in the plurality of data models according to whether the communication unit transmits and receives data.

In an embodiment, the processing unit may generate the basic data model, store the data in the basic data model, and then generate the extended data model.

In an embodiment, the processing unit may store the data in the basic data model, and then map the data stored in the basic data model to the extended data model to store the mapped data therein.

In an embodiment, the processing unit may link data stored in the basic data model with data stored in the extended data model.

In an embodiment, when the data stored in the basic data model is changed, the processing unit may change the data stored in the extended data model in response to the data change of the basic data model.

In an embodiment, when the data stored in the extended data model is changed, the processing unit may change the data stored in the basic data model in response to the data change of the extended data model.

A data collection apparatus of a power system according to the present disclosure may generate a plurality of data models, and allow any one data model to include the other data models so as to structuralize the data model, thereby having an effect capable of supporting various communication protocols as well as structurally performing data management and processing.

Furthermore, a data collection apparatus of a power system according to the present disclosure may generate a plurality of data models, and allow any one data model to include the other data models so as to structuralize the data model, thereby having an effect capable of reducing a storage space of data models and data for communication protocol support.

In addition, a data collection apparatus of a power system according to the present disclosure may manage data using a structured data model, thereby having an effect capable of enhancing data compatibility.

Moreover, a data collection apparatus of a power system according to the present disclosure may mange data using a structured data model, thereby having an effect capable of easily performing the collection, management and utilization of data.

BRIEF DESCRIPTION OF THE DRAWINGS

FIG. 1 is a conceptual diagram of a power system including a plurality of sites.

FIG. 2 is a configuration diagram of a data collection apparatus of a power system according to an embodiment of the present disclosure.

FIG. 3 is an exemplary diagram showing a structure of a data model in a data collection apparatus of a power system according to the present disclosure.

DETAILED DESCRIPTION

Figure 4:
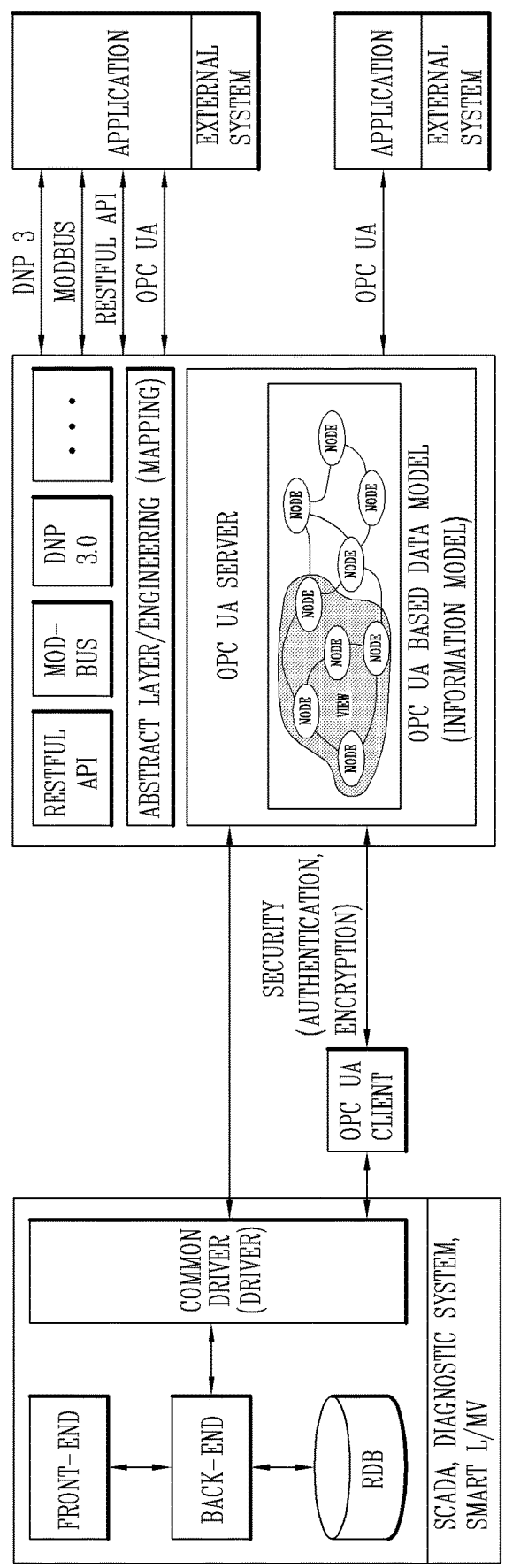
FIG. 4 is an exemplary diagram showing an example to which the data collection apparatus of the power system according to the present disclosure is applied.

Hereinafter, embodiments disclosed herein will be described in detail with reference to the accompanying drawings, and the same or similar elements are designated with the same numeral references regardless of the numerals in the drawings and their redundant description will be omitted.

In describing the technology disclosed herein, moreover, the detailed description will be omitted when specific description for publicly known technologies to which the invention pertains is judged to obscure the gist of the technology disclosed in the present specification. Also, it should be noted that the accompanying drawings are merely illustrated to easily explain the concept of the technology disclosed in the present specification, and therefore, they should not be construed to limit the concept of the technology by the accompanying drawings.

First, a power system 1000 according to the present disclosure will be described with reference to FIG. 1.

The power system 1000 refers to a system that monitors a plurality of sites 10 to 40 as illustrated in FIG. 1.

The power system 1000 may be a system that monitors and controls the power use of the plurality of sites 10 to 40.

The power system 1000 includes the plurality of sites 10 to 40 and a control system CS that centrally monitors the plurality of sites 10 to 40.

Here, the control system CS may include one or more apparatuses for monitoring the plurality of sites 10 to 40.

For instance, the control system CS may include at least one of a data collection apparatus 100 (hereinafter, referred to as a collection apparatus) that receives data of the plurality of sites 10 to 40 and a monitoring apparatus that performs monitoring using the collected data.

The plurality of sites 10 to 40 may be buildings that consume power.

The plurality of sites 10 to 40 may be defined in units of buildings.

For example, as illustrated in FIG. 1, the plurality of sites 10 to 40 may include a building A 10, a building B 20, a building C 30, and a building D 40.

Although the number of the plurality of sites 10 to 40 is shown as four in FIG. 1, the number of the plurality of sites 10 to 40 may be less than four, or may include four or more.

Each of the plurality of sites 10 to 40 may include a plurality of power consuming loads.

The plurality of sites 10 to 40 may each constitute a micro grid.

In addition, in each of the plurality of sites 10 to 40, a control system the monitors the power consumption of the site may be built.

The plurality of sites 10 to 40 may be managed by different systems, respectively.

For example, a system A may be built in the building A, a system B in the building B, a system C in the building C, and a system D in the building D, such that power consumption can be managed by different systems, respectively.

The plurality of sites 10 to 40 may use different communication protocols, respectively.

Here, the communication protocol may be one of an Open Platform Communications Unified Architecture (OPC UA) protocol, a RESTful API protocol, a MODBUS protocol, and a DNP protocol.

Accordingly, each of the plurality of sites 10 to 40 may perform communication using any one of the OPC UA, RESTful API, MODBUS, and DNP protocols.

For instance, the site A 10 may use the OPC UA protocol, the site B 20 may use the RESTful API protocol, the site C 30 may use the MODBUS protocol, and the site D 40 may use the DNP protocol.

As such, the plurality of sites 10 to 40 using different communication protocols may be communicatively connected to the control system CS of the power system 1000 to be monitored by the control system CS.

The control system CS may be a central system that communicates with the plurality of sites 10 to 40 to perform central monitoring for the plurality of sites 10 to 40 in the power system 1000 that monitors the plurality of sites 10 to 40.

The control system CS may use any one of the communication protocols as a basic protocol.

For example, the OPC UA protocol may be used as a basic protocol.

The control system CS may be supported by a communication protocol of each of the plurality of sites 10 to 40 to communicated with each of the plurality of sites 10 to 40.

That is, the control system CS may be supported by other protocols in addition to the basic protocol while using the basic protocol to communicate with each of the plurality of sites 10 to 40.

The control system CS, including the collection apparatus 100, may receive data from each of the plurality of sites 10 to 40 through the collection apparatus 100.

The collection apparatus 100 is a communication apparatus that communicates with each of the plurality of sites 10 to 40 to receive data from the plurality of sites 10 to 40, or a data processing apparatus that collects and processes data in the control system CS.

The collection apparatus 100, as shown in FIG. 2, may include a communication unit 110 that communicates with the plurality of sites 10 to 40 to receive data related to energy use information from the plurality of sites 10 to 40, a storage unit 120 in which a plurality of data models respectively corresponding to the communication protocols are stored to store the data in the plurality of data models, respectively, and a processing unit 130 that performs data modeling according to any one of the communication protocols to generate a basic data model, and perform data modeling according to the other communication protocols to generate one or more extended data models so as to allow the extended data models to be included in the basic data model and stored in the storage unit 120.

That is, the collection apparatus 100 may store data received from the plurality of sites 10 to 40, respectively, using the basic data model and the extended data model respectively corresponding to the communication protocols.

Here, the data model may refer to a data structure for storing the data.

The communication unit 110 may be a communication module that performs communication with the plurality of sites 10 to 40.

The communication unit 110 may communicate with the plurality of sites 10 to 40 through a wired or wireless communication method.

The communication unit 110 may communicate with each of the plurality of sites 10 to 40 according to a communication protocol corresponding thereto.

That is, the communication unit 110 may support all of the communication protocols used in the plurality of sites 10 to 40 to communicate with the plurality of sites 10 to 40, respectively.

The communication unit 110 may be communicatively connected to each of the plurality of sites 10 to 40 to receive data from each of the plurality of sites 10 to 40.

The data may include data on at least one of a voltage, a current, power, and an amount of power of the corresponding site.

The data may include data on at least one of a voltage, a current, power, and an amount of power of each power consuming device included in the corresponding site.

That is, the data may be data on at least one of a voltage, a current, power, and am amount of power of each of the plurality of sites 10 to 40.

The data may further include data on at least one of a temperature, a time, and a date of the corresponding site.

Each of the plurality of sites 10 to 40 may detect the energy use information of the corresponding site, communicate with the communication unit 110 according to the corresponding communication protocol, and transmit data on the detection result to the communication unit 110.

At least one of the plurality of sites 10 to 40 may use a basic protocol used by the control system CS.

At least one of the plurality of sites 10 to 40 may use the OPC UA protocol.

The other sites except for at least one of the plurality of sites 10 to 40 may use any one of RESTful API, MODBUS, and DNP protocols.

For example, the site A 10 uses the OPC UA protocol, and the other sites, which are the site A 20, the site C 30 and the site D 40 may use the RESTful API protocol, the MODBUS protocol, and the DNP protocol, respectively.

When at least one of the plurality of sites 10 to 40 uses the OPC UA protocol, the basic data model may be a model according to the OPC UA protocol.

That is, the basic data model may be a model in which data according to the OPC UA protocol is stored.

The extended data model may be a model according to any one of the RESTful API, MODBUS, and DNP protocols.

Each of the extended data models may be a model according to each of the RESTful API, MODBUS, and DNP protocols.

The communication unit 110 may perform communication according to the communication protocol based on the plurality of data models.

That is, the communication unit 110 may perform communication according to each of the communication protocols based on the basic data model and the extended data model.

The storage unit 120 may be a data storage module that stores the plurality of data models and the data.

The storage unit 120 may store the plurality of data models and the data by the processing unit 130.

The plurality of data models stored in the storage unit 120 are as illustrated in FIG. 3.

The plurality of data models may include the basic data model and one or more extended data models, and may be stored in the storage unit 120 with a structure as illustrated in FIG. 3.

As illustrated in FIG. 3, for the plurality of data models, using the basic data model as a first data model, the data and a second data model, a third data model and a fourth data model corresponding to the one or more extended data models may be included in the first data model.

That is, the plurality of data models may be stored in a form such that the data and the one or more extended data models are included in the basic data model.

Accordingly, a data structure based on the basic data model may be defined to perform data processing based on a communication protocol corresponding to the basic data model.

The processing unit 130 may be a data processing module that processes data transmitted and received by the communication unit 110, and generates and stores the plurality of data models in the storage unit 120.

The processing unit 130 may process data stored in the plurality of data models according to whether the communication unit 110 transmits or receives the data.

For instance, when the communication unit 110 receives data from any one of the plurality of sites 10 to 40, the communication unit 110 may process the data such that the received data is stored in the plurality of data models.

Furthermore, when the communication unit 110 transmits data to any one of the plurality of sites 10 to 40, the data may be processed such that the data stored in the plurality of data models is transmitted to the corresponding site.

The processing unit 130 may generate the basic data model, store the data in the basic data model, and then generate the extended data model.

That is, the processing unit 130 may perform data modeling according to any one of the communication protocols to generate the basic data model, store the data in the basic data model, and then perform data modeling according the other communication protocols to generate the one or more extended data models so as to allow the extended data models to be included in the basic data model as illustrated in FIG. 3.

The processing unit 130 may store the data in the basic data model, and then map the data stored in the basic data model to the extended data model to store the mapped data therein.

That is, the processing unit 130 may store the data in the basic data model, and map the data stored in the basic data model to the extended data model to allow the data to be stored in the extended data model.

Accordingly, in each of the extended data models, data stored in the basic data model may be mapped and stored according to a structure of the extended data model.

In this case, the data may be stored in each of the plurality of data models in a form corresponding to each of the plurality of data models.

For instance, data a, b, c and d data stored in a first data model corresponding to the basic data model are stored as a', b', c' and d' in a second data model among the extended data models, stored as a", b", c" and d" in a third data model among the extended data models, and stored as a*, b*, c* and d* in a fourth data model among the extended data models.

The processing unit 130 may link data stored in the basic data model with data stored in the extended data model.

That is, the data stored in the basic data model and the data stored in the extended data model may be changed in linkage with each other.

For example, when the data a stored in the basic data model is changed, data corresponding to the data a among the data stored in each of the extended data models may be changed in response to a change in the data a stored in the basic data model.

When the data stored in the basic data model is changed, the processing unit 130 may change the data stored in the extended data model in response to the data change of the basic data model.

That is, when the data stored in the basic data model is changed, data corresponding to the changed data in the basic data model among the data stored in the extended data models may be changed.

When the data stored in the extended data model is changed, the processing unit 130 may change the data stored in the basic data model in response to the data change of the extended data model.

That is, when the data stored in the extended data model is changed, data corresponding to the changed data in the extended data model among the data stored in the basic data model may be changed.

As described above, a specific application example of the collection apparatus 100 having a data structure in which the extended data model is included in the basic data model may be as illustrated in FIG. 4.

FIG. 4, which is a detailed exemplary diagram of the power system 1000, shows an example of a system configuration in which SCDA, diagnostic system, and SMART L/MV corresponding to the control system CS use an OPC UA protocol, and each of external systems (applications) corresponding to the plurality of sites 10 to 40 uses any one of the OPC UA protocol, the RESTful API protocol, the MODBUS protocol, and the DNP protocol.

In a system as illustrated in FIG. 4, a data structure in which data models such as the RESTful API protocol, the MODBUS protocol, and the DNP protocol used in the plurality of sites 10 to 40 are included in the OPC UA protocol-based data model used in the control system CS as the collection apparatus 100 may be defined, and data linkage between the basic data model and the extended data model may be achieved through abstraction layer/engineering (mapping) to easily perform data storage and management in the collection apparatus 100, and stably perform data transmission/reception and compatibility between the control system CS and the plurality of sites 10 to 40, thereby increasing the efficiency, accuracy, and usability of data operation in the power system 1000.

The foregoing preferred embodiments of the present disclosure are disclosed to solve technical problems, and it will be apparent to those skilled in this art that various modifications, variations and additions can be made thereto without departing from the spirit and scope of the present disclosure, and those modifications and the like should be construed to be included in the following claims.

The invention claimed is:

1. A data collection apparatus of a power system that manages a plurality of sites using different communication protocols, the data collection apparatus comprising:
   a communication unit that communicates with the plurality of sites to receive data on energy use information from the plurality of sites;
   a storage unit that stores a plurality of data models corresponding to the communication protocols, respectively, to store the data in the plurality of data models, respectively; and
   a processing unit that performs data modeling according to any one of the communication protocols to generate a basic data model, and performs data modeling according the other communication protocols to generate one or more extended data models so as to allow the extended data models to be included in the basic data model and stored in the storage unit;
   wherein the processing unit is configured to:
      generate the basic data model,
      store the data inside of the basic data model,
      generate the one or more extended data model, corresponding to each of the other communication protocols,
      store the one or more extended data models inside of the basic data model, map the data stored inside of the basic data model to each of the one or more extended data model, thereby producing mapped data corresponding to each of the one or more extended data models, and
      store each of the mapped data inside of each of the one or more extended data models,
      wherein the data stored inside of the basic data model are stored separately from a plurality of extended data models stored inside of the basic data model.

2. The data collection apparatus of claim 1, wherein each of the plurality of sites uses any one of OPC UA (Open Platform Communications Unified Architecture), RESTful API, MODBUS, and DNP protocols.

3. The data collection apparatus of claim 2, wherein the basic data model is a model according to the OPC UA protocol.

4. The data collection apparatus of claim 2, wherein the extended data model is a model according to any one of the RESTful API, MODBUS, and DNP protocols.

5. The data collection apparatus of claim 1, wherein the communication unit performs communication according to the communication protocol based on the plurality of data models.

6. The data collection apparatus of claim 1, wherein the processing unit processes data stored in the plurality of data models according to whether the communication unit transmits and receives data.

7. The data collection apparatus of claim 1, wherein the processing unit links data stored in the basic data model with data stored in the extended data model.

8. The data collection apparatus of claim 7, wherein when the data stored in the basic data model is changed, the processing unit changes the data stored in the extended data model in response to the data change of the basic data model.

9. The data collection apparatus of claim 7, wherein when the data stored in the extended data model is changed, the processing unit changes the data stored in the basic data model in response to the data change of the extended data model.

\* \* \* \* \*